United States Patent [19]

Shutt et al.

[11] 4,246,463
[45] Jan. 20, 1981

[54] METHOD AND APPARATUS FOR ARC WELDING OF METAL PLATES FROM ONE SIDE ONLY

[75] Inventors: Robert C. Shutt, Gates Mills; Thomas J. Black, Middleburg Heights; Victor Y. Matthews, University Heights, all of Ohio

[73] Assignee: The Lincoln Electric Company, Cleveland, Ohio

[21] Appl. No.: 11,946

[22] Filed: Feb. 13, 1979

Related U.S. Application Data

[63] Continuation of Ser. No. 801,624, May 31, 1977, abandoned.

[51] Int. Cl.³ .............................................. B23K 9/18
[52] U.S. Cl. .................... 219/73.2; 219/73; 219/122; 219/137 R
[58] Field of Search ........... 219/124.03, 137 R, 137.2, 219/73 R, 122, 73.2

[56] References Cited

U.S. PATENT DOCUMENTS

| | | | |
|---|---|---|---|
| 2,583,507 | 1/1952 | Carpenter | 219/124.03 X |
| 2,847,555 | 8/1958 | Yenni | 219/137.2 X |
| 2,938,107 | 5/1960 | Pease | 219/124.03 X |
| 3,274,371 | 9/1966 | Manz | 219/137 R |
| 3,293,400 | 12/1966 | Brogdon | 219/73 R |
| 3,549,856 | 12/1970 | Saenger | 219/137 R |
| 3,624,345 | 11/1971 | Armstrong | 219/137 R |
| 3,859,495 | 1/1975 | Takahashi | 219/73 R X |
| 4,088,866 | 5/1978 | Lund | 219/137 R |

FOREIGN PATENT DOCUMENTS

| | | | |
|---|---|---|---|
| 1347480 | 11/1963 | France | 219/137 R |
| 2076984 | 9/1971 | France | 219/73.2 |
| 2314016 | 7/1977 | France | 219/73.2 |

OTHER PUBLICATIONS

Knight, D. E., Multiple Electrode Welding by "Unionmelt" Process, Welding J., Apr. 1954, pp. 303 to 312.
Frost, et al., Submerged–Melt Welding with Multiple Electrodes in Series, Welding J., Feb. 1951, vol. 30, #2 pp. 103 to 110.

*Primary Examiner*—Richard R. Kucia
*Attorney, Agent, or Firm*—Meyer, Tilberry & Body

[57] ABSTRACT

An apparatus for arc welding of a pair of spaced steel plates from one side only using a grooved back-up plate which gives a good weld bead shape on the under side, gives high linear welding speeds, and avoids contamination of the deposited weld metal by the metal from the back-up plate. A pair of consumable electrodes connected in electrical series between the output terminals of the power source and with one connected by an independent connection to the workpiece are advanced into the weld gap on lines of movement which intersect at a point above the lower surfaces of the plates so that an arc is maintained between the electrodes spaced from the base of the back-up plate groove. A separately energized electrode trails the first two electrodes and deposits a weld bead on the first deposited weld metal while it is still hot.

20 Claims, 2 Drawing Figures

METHOD AND APPARATUS FOR ARC WELDING OF METAL PLATES FROM ONE SIDE ONLY

This is a continuation, of application Ser. No. 801,624 filed May 31, 1977 now abandoned.

This invention pertains to the art of electric arc welding and more particularly to an apparatus for electric arc welding together of metal plates from one side only.

In the art of arc welding of large steel plates, it is often times inconvenient or impossible to weld the plates from first one side and then invert them and complete the weld from the opposite side. It is necessary, however, if the ultimate weld bead is to have maximum impact, fatigue, and other strength characteristics, that the weld bead both at the lower and upper surfaces have a proper contour and blend smoothly into the surfaces of the plate. If not, areas of stress concentration can result in early failure of the weld.

In the welding of such large steel plates, it has been conventional in the past to place the edges of the plates in spaced parallel relationship and bridge the under side of the gap so formed with an elongated back-up plate which plate normally has a flux filled shallow groove therein of a width greater than the spacing between the edges. Thereafter, the gap between the plates is filled with a granular flux and a welding electrode electrically energized relative to the two metal plates is advanced into the gap and an arc struck between the edges of the plates and the end of the electrode. The heat from the arc melts the flux, melts the end of the electrode and the edges of the plate. The molten flux in the gap protects the molten weld pool from the atmosphere, and the flux in the back-up plate groove at least in part melts and supports the weld pool, preventing the molten metal from coming into contact with the metal of the back-up plate. This flux also shapes the under side of the weld metal as it hardens, shaping the surface and causing its edges to blend smoothly into the surfaces of the plate.

One of the principal problems in this type of welding has been that the arc on the end of the electrode will occasionally drive through the flux filling the groove, thus melting the metal of the back-up plate and this molten metal co-mingles with the deposited weld metal and effects a contamination which reduces the physical characteristics of the ultimate weld bead. Other problems have been the slowness of the depositing of the weld bead. Inasmuch as the weld bead to be deposited can have lengths of up to 50–100 feet or more, it will be appreciated that if the welding speed can be increased, the total length of time to effect the weld can be substantially reduced. It is the length of time required for the initial first pass which determines the amount of plate which can be welded in a given length of time. Once the initial pass is completed, the now welded plates can be moved to other locations and the remainder of the weld gap filled up using other welding techniques.

Various ways have been used in the past for the welding of large steel plates from one side only, for example: single or multiple electrode, submerged-arc type of welding using: a grooved copper back-up plate with flux in the groove positioned under the weld gap; a ceramic back-up tape positioned under the weld gap; a flux type back-up tape positioned under the weld gap; a highly chilled copper back-up plate and more recently, either iron powder positioned in the bottom of the weld gap prior to the welding or as described in the U.S. Patent to Brogdon, 3,293,400, a grooved back-up plate in combination with a "cold wire" fed into the back-up plate groove so as to be in contact with the bottom thereof and underneath another welding electrode being fed into the weld gap and electrically energized relative thereto. The heat of fusion of this cold wire (or in the case of the iron powder) absorbs heat and augments the cooling of the flux within the groove adjacent the surface of the groove and as stated in the patent, the cold wire effectively produces a solidified flux layer which serves as a barrier layer to insulate the arc from the back-up plate to prevent melting of the back-up plate and contamination of the weld metal by the back-up plate metal. Whether or not the process described in this patent produces the stated results is unknown although to applicants' belief, the process is not being used commercially today.

All of the above methods have had various problems, for example, different fluxes are required for filling the back-up plate groove and for filling the gap between the plates as the welding progresses. Further, the proper alignment of the plates over long distances has proven to be quite difficult. There is a tendency for the tapes, if used, to move. If a water cooled back-up plate is used, this involves complicated fixturing to hold the back-up plate and the plates to be welded in the proper relative positions.

A further problem was that if the driving of the arc through to the back-up plate was to be avoided, the amount of welding current and/or voltage employed had to be somewhat limited to reduce penetration and this in turn limited the pounds of metal per unit of time melted off such that the lineal welding rate was substantially lower than is possible with the present invention.

Further, and perhaps most importantly, even when these aforementioned problems are solved the resulting back bead is often inconsistent, not uniform and therefore not acceptable.

The present invention contemplates a new and improved method and apparatus for depositing a weld bead from one side only to join a pair of metal plates which enables the rapid deposition of a weld bead which smoothly blends into the back surfaces of the plates and wherein the problems of contamination of the weld metal by metal from the back-up plate are eliminated.

In accordance with the invention, arc welding apparatus is provided comprised of: a pair of welding heads each arranged to simultaneously feed a consumable welding electrode into the gap between the edges to be welded on lines of movement which intersect within the gap, i.e. above the lower or bottom surfaces of the gap, the two welding heads being arranged to energize the electrodes from a power source through a pair of power leads with a voltage differential sufficient to maintain an arc between the electrodes; and a substantially zero impedance third power leads connecting effectively the workpiece to one of the electrodes whereby the arc current in the other electrode will divide between the said one electrode and the workpiece producing an arc between the other electrode and both the one electrode and the workpiece.

Further in accordance with the invention, the apparatus includes a third welding head close spaced to the first two heads and movable simultaneously therewith and arranged to feed a consumable welding electrode onto the weld metal deposited by the electrodes feeding from the first two heads.

In effect, the invention employs the high melt-off rate per ampere of a series arc to obtain high lineal welding speeds in combination with the low penetration characteristics of a series arc and proper location of same to prevent the arc from driving through the flux in the back plate groove to melt the back-up plate. The invention then further modifies this series arc by a power lead connecting one of the auxiliary electrodes so that the arc current in the main electrode divides between the auxiliary electrode and the workpiece. The arc is thus stabilized within the gap. This produces an arc between not only the two electrodes and within the gap, but between the main electrode and the edges and also within the gap.

The invention then uses a following weld bead to shape or smooth out the usually humped shaped of the modified series arc deposited bead. Because the problem of varying penetration is controlled and because of the high melt-off rate, lineal welding speeds never heretofore obtainable have resulted. Also the under surface of the weld bead is uniformly consistent and weld blended.

The principal object of the invention is the provision of a new and improved process for depositing a weld bead from one side only of a workpiece which is simple in operation, relatively fast, which provides a uniform weld bead which blends smoothly into the back side of the plates being welded, and which prevents contamination of the weld metal by metal from a back-up plate.

Another object of the invention is the provision of a new and improved process of welding together of a pair of plates from one side only wherein a pair of electrodes are fed into a gap between the plates in such a manner that an arc is maintained between the ends of the two electrodes at a point spaced above the back of the plates and simultaneously an arc is maintained between one of the electrodes and the workpiece.

Still another object of the invention is the provision of a new and improved process for depositing weld metal in the space between the edges of plates to be welded wherein penetration of the arc into a back-up plate is prevented by positively locating a principal arc within the gap and stabilizing the process by maintaining a minor arc between one of the electrodes and the edges.

Another object of the invention is the provision of a new and improved process for welding together a pair of plates from one side only which consistently results in uniform and acceptable welding beads.

Another object of the invention is the provision of a new and improved process for welding together the spaced edges of a pair of metal plates from one side only which provide a more rapid lineal welding speed than has heretofore been obtainable.

A further object of the invention is the provision of a new and improved process for the welding together of a pair of steel plates which uses a pair of consumable welding electrodes connected in electrical series with the output terminals of the power source and which are fed into the gap between the edges of the plates to be welded on lines of movement which intersect so that the welding arc does not melt the back-up plate.

Another object of the invention is the provision of a new and improved arrangement for stabilizing a series arc within the gap formed by the edges of a pair of spaced plates being welded.

Another object of the invention is the provision of a new and improved arrangement for welding the spaced edges of a pair of plates using a back-up plate wherein a pair of electrodes are fed into the gap between edges of the plates so that an arc is maintained therebetween whereby to melt off large amounts of metal per unit of heat energy input and a small portion of the energy of one of the electrodes is directed to the edges whereby to deposit a weld bead without fear of contamination of the weld metal from the back-up plate.

Another object of the invention is the provision of a new and improved apparatus for welding together from one side only the spaced edges of a pair of plates which consist of a pair of welding heads arranged to advance consumable electrodes on paths intersecting within the space between the edges, one of the electrodes being electrically connected to the workpiece and the other electrode is electrically energized relative to the first electrode and the workpiece.

The invention may take physical form in certain parts and arrangements of parts and certain steps and combinations of steps, preferred embodiments of which will be described in detail in this specification and illustrated in the accompanying drawings which form a part hereof and wherein.

Figure 2:
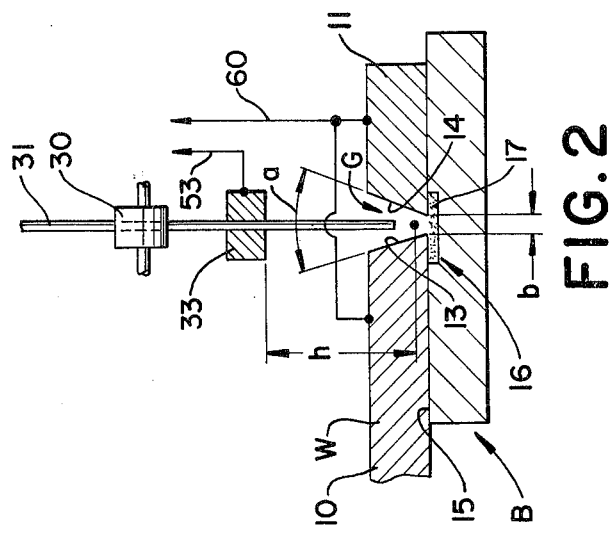
FIG. 2 is a cross sectional view of FIG. 1 taken approximately on the line 2—2 thereof.
Figure 1:
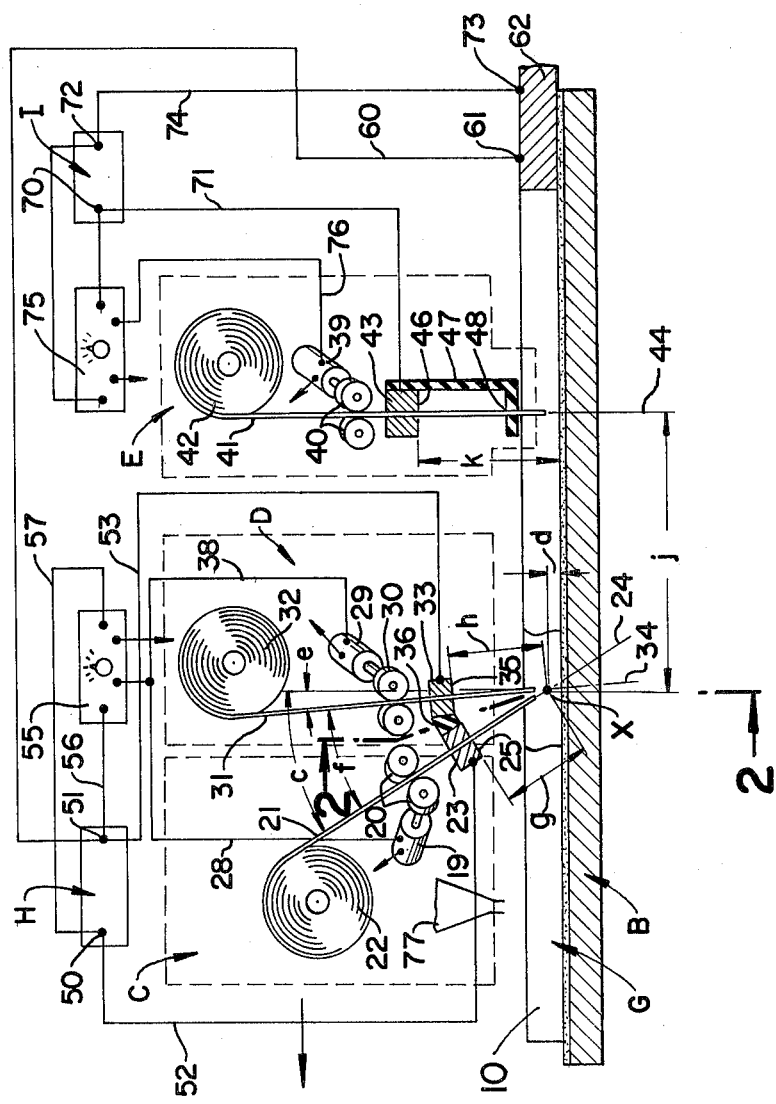
FIG. 1 is a cross sectional view through the gap to be welded showing the back-up plate in position and schematically showing the welding heads, all illustrating a preferred embodiment of the invention.

Referring now to the drawings where the showings are for the purposes of illustrating a preferred embodiment of the invention only and not for the purposes of limiting same, the figures show a workpiece W to be welded, a back-up plate B positioned below the workpiece and three welding heads C, D, E all arranged to move in tandem from right to left as shown in FIG. 1 so as to deposit weld metal in a gap G between the two plates making up the workpiece W. The heads C, D are energized from a power source H while head E is energized from a power source I.

The workpiece W may take any one of a number of different forms but in the embodiment shown is comprised generally of two metal plates 10, 11 having spaced parallel extending edges 13, 14 which define the welding gap G. These edges may be shaped as desired and as is conventional in the welding art but in the embodiment shown, are beveled at an angle "a" so as to diverge in an upward direction. In the preferred embodiment, the angle "a" is approximately 45° although obviously, the angle "a" may vary as desired, for example, from 40°-60° may be employed with generally equal results. Obviously, the lower portion of the edges may be provided with a land as is conventional in the welding art, The lower corner of the edges 13, 14 are spaced a distance "b" which conventionally may vary from $\frac{1}{8}$ inch to $\frac{1}{4}$ inch as is general in the art.

The back-up plate B may also take any one of a number of different forms but is generally in the form of a flat plate of copper having an upper surface 15 in abutting engagement with the lower surfaces of the plates 10, 11 so as to bridge the lower side of the gap G. This upper surface 15 preferably has a rectangular groove 16 formed therein of a width greater than the width of the lower portion of the gap G and of a depth which is relatively conventional in the welding art. 3/32 of an inch depth has proven satisfactory in practice. This groove 16, prior to the back-up plate B being placed in position under the plate 10, 11 is filled with a granular welding flux 17 which welding flux can be the same as that employed in the ultimate welding operation. While various fluxes may be employed, a flux manufactured under the trademark "LINCOLNWELD 761" by the assignee of this patent application is preferred when welding on steel plate.

The back-up plate B may be of any conventional material and/or construction, for example, solid copper, hollowed out copper with cooling water circulating therethrough, ceramic, graphite, or otherwise. The only function of the back-up plate is to support the flux 17 in position below the gap G some of which flux in turn melts, supports the molten metal in the weld pool, (separating it from the back-up plate) and then shapes the under surface of the weld bead as the weld metal solidifies. Because the flux melts when in contact with the molten weld metal, the result is a uniform, smooth, shiny weld bead which blends smoothly into the under surface of the plates 10, 11 without undercutting or jagged edges.

The welding head C is relatively conventional and includes a motor 19 which drives a pair of pinch rolls 20 which advance a welding electrode 21 from a supply reel 22 past electrical contact means 23 which after it leaves contact means 23 moves on a longitudinal line of movement 24 extending through the mid plane of the gap G. This line of movement 24 is at an angle "c" from the vertical or perpendicular line to the plate surfaces. Preferably the angle is positive, i.e. it leans in or leads the direction of welding and the electrode "drags".

In a like manner, the welding head D is comprised of a motor 29 driving a pair of pinch rolls 30 which in turn drive an electrode 31 from a supply reel 32 past contact means 33 which after it leaves the contact means 33 moves on a line of movement 34 extending through the middle of gap G and intersects with the line of movement 24 of the electrode 21 at a point X. This line of movement 34 has an angle "e" relative to a perpendicular which results in an angle "f" between the lines of movement 24 and 34.

The welding head C and D are relatively conventional and in the preferred embodiment are manufactured and sold under the trademark NA4 by the assignee of this application. Thus, in such welding heads, the contact means 23, 33 are each in the form of an electrically energized tube of copper having a passage just large enough to pass the electrodes 21, 31 and the lower ends 25, 35 are spaced from the point X by distances "g" and "h" respectively which distances may be referred to as the "stick-out" distances. It will be appreciated that during welding, the ends of the electrodes will have burned back a slight distance from the point X so that the actual stick-out distance may be slightly less than the distance "g" and "h". As described in U.S. Pat. No. to Landis et al, 2,721,249, the electrode melt-off rate for a given arc current can be increased by increasing this "stick-out" distance. By relatively adjusting the stick-out distances "g" and "h", the relative melt-off rates may be adjusted, provided the feed down rates of the electrodes are also relatively adjusted. Equal stick-out distances are preferred. Importantly, means in the form of a rigid insulating member 36 hold the contact means 23, 33 in their exact predetermined angular and spaced relationship through the entire welding process. Other means may be employed and these means may be fixedly adjustable. The welding head C precedes the head D during welding and its electrode will be referred to herein as the leading series head or electrode and head D and its electrode will be referred to as the trailing series head or electrode.

The power source H has a pair of output terminals 50, 51 with the terminal 50 being connected to contact means 23 through a heavy wire conductor or power lead 52 while terminal 51 is connected to contact means 33 through a heavy conductor or power lead 53. The power source H may be either AC or DC but in the preferred embodiment is AC.

In the preferred embodiment, the motors 19, 29 are connected substantially in parallel so that they both operate at substantially the same speed which speed varies proportional to the arc voltage. In accordance with the invention, the electrodes 21, 31 are advanced at substantially the same feed speed with the feed speed tending to increase as the arc voltage tends to increase such as to maintain a generally constant arc voltage which results in a constant arc length. The speed of motors 19, 29 may be made independently adjustable if desired.

Power is supplied to the motors 19, 29 from a common control 55 through leads 28 and 38. This control 55 is in turn connected to the output terminals of power source H by leads 56, 57. The welding heads C, D must be electrically insulated from each other inasmuch as the electrodes 21, 31 are always at a voltage difference equal to the arc voltage. The electrodes are thus in series with the output terminals of the power source and there is an arc formed therebetween which continuously melts off both electrodes 21, 31 as they are fed into the gap G to deposit molten metal therein and on the flux 17.

The invention also contemplates improved means for stabilizing the arc in the gap. Thus, importantly in accordance with the present invention, one of the electrodes 21, 31 is at generally the same electrical potential as the workpiece W, this leading accomplished by a heavy wire conductor or power lead leading from the workpiece W to one of the contact means 23, 33 or to the corresponding output terminals 50, 51 on the power source H.

In the preferred embodiment, the terminal 51 is electrically connected to the workpiece W by a heavy wire conductor forming a substantially zero impedance power lead 60 connecting to a terminal point 61 on a plate 62 which is normally tack welded to the ends of the plates 10, 11 as is conventional in the welding art before a welding operation on large plates commences.

The power leads 52, 53, 60 are preferably of the same length and size wire or conductor. With such an arrangement, it has been found that the current in power lead 52 the electrode 21 divides, two thirds of it flowing in power lead 53 and one third flowing in power lead 60. The division of this current is, in some respects, determined by the relative impedance of the conductors 53 and 60. Variations in the relative lengths (or size) of the conductors result in some variation of the current division but the quality of the weld bead remains the same.

In tests leading to the present invention, it was found that without the power lead 60, the arc between the series electrodes 21, 31 tended to wander and to move out of the lower portion of gap G. However, with the third power lead 60 described, the arc immediately became stabilized and remained down at the bottom of gap G resulting in a smooth and rapid deposition of metal in the gap to effect the desired smooth uniform back bead. On the other hand, the arc never penetrated to the base of the back-up plate groove.

Importantly using the invention, the major arc current is between the ends of two electrodes being fed into the weld gap on intersecting lines of movement which are preferably at an acute angle relative to each other. As the actual arcing ends of the electrodes are slightly spaced, i.e. from and above the point of intersection X, the result is a generally horizontal arc between these ends.

Because the minor arc current is relatively low compared to other processes and because the arcing end of the energized electrode 21 is always spaced substantially from the groove bottom, the arc is between the leading electrode and the sides of the gap. The tendency for this arc to drive through the molten flux 17 in the groove 16 to the metal of the back-up plate B is eliminated while at the same time maintaining the high lineal welding speeds of the total arc current for a series arc, In effect, the arcing end of the energized electrode 21 is closer to the edges 13, 14 than to the groove bottom.

The location of the point X is important. It is always on the mid plane between the edges 13, 14 and is always located a suitable distance above the back of the plates such that the arc and its penetration are carefully controlled. In effect, a major arc must exist between the ends of the two electrodes 21, 31 with the metal thereof dropping as it melts into the weld pool formed by the minor arc.

The electrodes, of course, have a finite thickness while the lines of movement are dimensionless. Thus, the distance "d" must be great enough taking into consideration the diameters of the electrodes that the lowest side of the electrode does not extend outside the gap. As used herein "within the gap" or "within the weld gap", means in the gap between the upper and lower surfaces of the workpiece W.

In this respect, the invention may be distinguished from the above referred to patent to Brogdon wherein the point of intersection of the two lines of movement is well below the bottom of the groove and the line of movement of the cold electrode as it exits the wire nozzle is such that the wire is pressed against the bottom of the groove with a force sufficient to bend the wire into a curved shape. Also using the preferred angles "c", "e", and "f" set forth herein after and shown in the FIGURES, the arc between the electrodes 21, 31 is generally horizontal.

The distance "d" is always at least $\frac{1}{8}$ of an inch and is preferably $\frac{1}{4}$ of an inch. Generally it will be less than 7/16 of an inch.

The distance "d", "g" and/or "h" may be adjusted by raising or lowering one or both heads, moving them closer or farther apart, or by adjusting the angle "f".

So long as the distance "d" is maintained as above discussed, it is believed that the angles "c", "e" and "f" can be varied over rather wide limits. One limitation on the angles "c" and "e" is that if increased too much from the perpendicular in either direction, the contact means 23, 33 which have finite dimensions, will touch the edges 13, 14.

The welding head E may take any one of a number of different forms capable of laying down a weld bead but in the preferred embodiment is similar to the welding head C, or D and includes a motor 39 driving a pair of pinch rolls 40 which in turn drive an electrode 41 from a supply reel 42 past contact means 43 preferably in the form of a tube of copper on a line of movement 44, which line extends through the mid plane of the gap G and is spaced from the point X by a distance "j". The lower end 46 of the contact means 43 is spaced a distance "k" from the lower surface of the plates and it will be noted that the distance "k" is substantially greater than the distances "g" and "h". The head E differs from heads C, D only in that a downwardly extending insulating guide 47 is mounted on the contact means 43 which guide has a passage 48 aligned with the contact means 43 passage which guides the lower end of the electrode 41 just before it enters the gap G. The use of such a guide is described in the said Landis et al patent and prevents the heated end of the electrode 41 from wandering relative to the mid plane of the gap G.

All three welding heads C, D, and E are mounted on means not shown, but conventional, whereby the three welding heads may be moved from right to left as viewed in FIG. 1 in tandem in a direction parallel to the length of the gap G to deposit weld beads as will be described.

The power source 1 energizes the welding head E and includes an output terminal 70 connecting to contact means 43 through a heavy conductor or power lead 71 and an output terminal 72 connecting to terminal 73 on the plate 62 through conductor or power lead 74. This power source I is generally identical to the power source H. Motor 39 is energized from a control box 75 similar in operation to control box 55 through wire 76.

The welding head C also includes a flux hopper not shown and a flux nozzle 77 disposed generally on the mid plane on the gap G and in advance of the point X to deposit a granular welding flux in the gap G in advance of the electrodes 21, 31.

The electrodes 21, 31 may be of either the solid or flux cored type. If the electrodes are solid then a granular welding flux should be employed. If the electrodes are of the flux cored type, the granular flux deposited through the flux nozzle 77 can sometimes be dispensed with.

The electrode 41 supplied from the welding head E may similarly be either of the solid or flux cored type.

As previously indicated, the electrode 41 may be replaced by a pair of electrodes rather than the single one shown and these electrodes may be used in conventional twin arc arrangements either tandem or side by side and with or without the extended stick-out.

The present invention provides a condition within the weld gap wherein there is substantially reduced downward arc force and thus there is no tendency for the arc to drive through the joint and dig into the back-up plate system.

The limited current between the leading electrode and the workpiece gives just enough direction to the arc so that the resultant back bead shape is very iniform. The invention gives approximately double the deposition rate at the same current or heat input as would be obtained with standard single wire submerged arc system with approximately $\frac{1}{3}$ the penetration of the single wire system.

Although other means may be used, the most reproducible method of setting the procedure is to adjust the controls for a given arc voltage and wire fed speed and then allowing this feed speed to vary proportionally to the arc voltage so as to maintain the arc voltage generally constant (i.e. a constant arc length).

The stick-out distance "g" and "h" can be varied over a wide range and still obtain good under bead shape. A stick-out distance of two inches gives good control of the position of the electrode tip in the gap and enough clearance of the lower end of the electrode nozzle from the upper surfaces of the workpiece.

The A.C. power supplied to electrodes 21, 31 and 41 by power sources H, I is preferably in phase.

The travel speed of the three heads along the length of the weld can be varied in the same way as any submerged arc welding system. The controlling factors are the volume requirements of metal to fill the joint and the bead size required.

Using the conditions referred to hereinafter for the welding heads C and D, it is possible to obtain a uniform, smooth, well-contoured, high-quality back bead with plates ⅜ of an inch in thickness and above. While the back bead contour is good, the upper surface of the bead tends to be more rounded than desired. Using the trailing arc of the welding head E, the upper surface of the resultant combination weld bead is made highly desirable. The single wire, long stick-out of head E appears to be preferable over other forms of welding such as single wire with conventional stick-out, twin arc, or tandem arcs.

For ⅜ and ½ inch thick steel plate, the modified series arc of heads C, D and the trailing arc head E enable completion of the weld joint in one pass. For plates ¾ of an inch thick and over, the method and apparatus described only partially fills the weld joint. Subsequent fill passes are usually required to complete the weld and can be made with any of the well known processes.

Normal variations of the temperature of the copper back-up plate do not affect the shape or quality of the under bead as is true in some of the other known systems for welding plates from one side only.

TYPICAL WELDING CONDITIONS ARE AS FOLLOWS:

Plate Thickness, Inches—⅜-½
Material—Steel
Dimensions or Angles
  a (Gap Angle)—45°
  g (Gap Width)—¼
  c (Angle, head C)—+32°
  d (Height of X)—¼
  e (Angle, head D)—+5°
  f (Included Angle, head C-D)—27°
  g (Stick-Out, head C)—2"
  h (Stick-Out, head D)—2"
  j (Spacing, head D to head E)—5"
  k (Stick-Out, head E)—5"
  Land Width—0
Welding Speed, Inches/Min.—20-25

| Welding Conditions | | | |
|---|---|---|---|
| Head | C | D | E |
| Electrode (Solid) | L70* | L70* | L70* |
| Flux | 761* | 761* | 761* |
| Electrode Diameter, Inches | 3/16 | 3/16 | 3/16 |
| Wire Feed Speed, Inches/Min. | 45 | 45 | 40 |
| Current Amperes | 700 | 700 | 600 |
| Arc Voltage | 32-34 | 32-34 | 32 |

*Trademarks of The Lincoln Electric Company

The invention has been described with reference to a preferred embodiment, the preferred embodiment being shown somewhat schematically but in sufficient detail to enable one skilled in the art of electric arc welding to make and use the invention. Obviously, alterations and modifications differing from the embodiments described but using the invention will occur to such persons upon a reading and understanding of this specification and it is our invention to include all such modifications and alterations insofar as they come within the scope of the appended claims.

Having thus described the invention, we claim:

1. In electric arc welding apparatus for depositing weld metal in the horizontally extending gap between a pair of workpieces wherein the bottom of the gap is bridged by a back-up plate having an upwardly facing surface, said apparatus including first and second welding heads supported for simultaneous tandem movement parallel to said gap, said heads including: means for feeding in tandem a first leading and a second trailing consumable electrode downwardly on first and second predetermined lines of movement; and, first and second electrode contact means associated with the first and second electrodes respectively; first and second power leads from said first and second contact means respectively, each adapted to be connected to a separate terminal of an arc welding power source whereby there will be a series arc between said electrodes; the improvement which comprises: means fixing said heads relative to each other so that said tandem lines of movement intersect at a point aligned with said gap and above said upwardly facing surface of said back-up plate and at a distance of at least ⅛ inch above the lower surfaces of the workpieces; and, a third substantially zero impedance power lead effectively connecting said workpieces to one of said contact means whereby said contact means will be at substantially workpiece potential and a substantial portion of the welding current flowing through the other of said contact means will flow through said third power lead.

2. The improvement of claim 1 wherein the line of movement of said first electrode leads said point of intersection by an angle of approximately 32° to the vertical.

3. The improvement of claim 1 wherein the line of movement of said second electrode leads said point of intersection by an angle of approximately 5° to the vertical.

4. The improvement of claim 1 wherein the lines of movement of said first and second electrodes lead said point of intersection by angles of approximately 32° and 5° to the vertical respectively.

5. The improvement of claim 1 wherein said third power lead connects to said second contact means.

6. The improvement of claim 4 wherein said third power lead connects to said second contact means.

7. The improvement of claim 1 including a third welding head having means for feeding a third consumable welding electrode towards said groove on a line of movement between said edges, means fixing said line of movement so as to be spaced from said point of intersection of the lines of movement of said first and second electrodes.

8. The improvement of claim 1 wherein said third power leads connects said workpieces directly to said one contact means.

9. The improvement of claim 1 wherein said third power lead is adapted to be connected directly to the terminal of said power source adapted to be connected to said one contact means.

10. In a method of electric arc welding together the spaced parallel edges of a pair of metal plates wherein:

the gap below the edges is bridged by a backup plate having an upwardly facing surface; first and second consumable welding electrodes, in electrical series with the output terminals of a power source, are advanced longitudinally toward the gap between said edges on converging lines of movement and moved in tandem parallel to said gap with said first electrode leading said second electrode; the improvement which comprises: one of said electrodes being electrically connected to said plates by substantially zero impedance means and thus being at substantially workpiece potential, said lines of movement intersecting at a point vertically aligned with said gap and spaced above said backup plate surface and at least ⅛ inch above the lower surfaces of said plates whereby an arc is formed both between the ends of said electrodes and between the other electrode and said edges and weld metal is deposited in said gap.

11. The improvement of claim 10 including said first electrode having an angle of approximately 32° and said second electrode being electrically connected to said workpiece.

12. The improvement of claim 10 including said second electrode having an angle of 5° relative to said workpiece and said second electrode being electrically connected to said workpiece.

13. The improvement of claim 10 including said first and second electrodes having angles of approximately 32° and 5° respectively and said second electrode being electrically connected to said workpiece.

14. The method of claim 10 including depositing a second weld bead in said groove at a point spaced from and lagging the point of intersection of said first and second electrodes.

15. The method of claim 10 wherein the point of intersection of said lines of movement is from ⅛ to 7/16 inches above the bottom surfaces of said plates.

16. The method of claim 15 wherein said first electrode has an angle of approximately 32° and said second electrode is electrically connected to said plates.

17. The improvement of claim 15 wherein said second electrode has an angle of approximately 5° relative to said plates and said second electrode is electrically connected to said plates.

18. The improvement of claim 14 wherein said first and second electrodes have angles of approximately 32° and 5° respectively and said second electrode is electrically electrically connected to said plates.

19. The method of claim 15 including the additional step of depositing a second weld bead onto the weld bead deposited by said two electrodes while said weld bead is still at an elevated temperature.

20. The improvement of claim 10 wherein said gap is at least partially filled with a submerged arc type granular flux.

* * * * *